United States Patent [19] [11] Patent Number: 4,976,532
Nyman [45] Date of Patent: Dec. 11, 1990

[54] HANGER FOR DISPLAYING EYEGLASSES

[75] Inventor: Michael S. Nyman, Ft. Lauderdale, Fla.

[73] Assignee: Al-Site Corp., Miami, Fla.

[21] Appl. No.: 278,546

[22] Filed: Dec. 1, 1988

Related U.S. Application Data

[63] Continuation-in-part of Ser. No. 145,222, Jan. 19, 1988, abandoned.

[51] Int. Cl.⁵ .......................... G02C 1/00; A47F 7/02; A41D 27/22
[52] U.S. Cl. ..................................... 351/158; 351/41; 211/59.1; 223/85; 2/13
[58] Field of Search .......................... 351/41, 158, 155; 211/59.1, 106; 223/85, 87; 2/271, 13; 206/5.1; 248/902; 24/16 P, 16 B, 30.5 P

[56] References Cited

U.S. PATENT DOCUMENTS 2,212,596  8/1940  Fuller .............................. 351/155 X
3,710,996  1/1973  Smilow et al. ......................... 223/87
3,799,357  3/1974  Govang ............................... 211/59.1
4,441,233  4/1984  Swift ................................. 24/16 PB
4,724,967  2/1988  Valiulis .............................. 211/59.1

Primary Examiner—Rodney B. Bovernick
Attorney, Agent, or Firm—Ostrolenk, Faber, Gerb & Soffen

[57] ABSTRACT

A pair of non-prescription eyeglasses is mounted on a cantilevered support by a hanger that includes an element constructed of relatively stiff resilient plastic material. Such element includes a relatively wide main section having an aperture which receives the support arm, and a relatively narrow extension. The latter passes through the nose gap of the eyeglasses and is reversely bent to form a loop that surrounds the eyeglass frame bridge. In a first embodiment of this invention a rivet maintains the loop closed and prevents casual removal of the hanger from the eyeglasses. In a second embodiment a snap-type device holds the loop closed. This snap-type closure cannot be opened casually, at least for the first opening thereof.

19 Claims, 2 Drawing Sheets

U.S. Patent  Dec. 11, 1990  Sheet 1 of 2  4,976,532
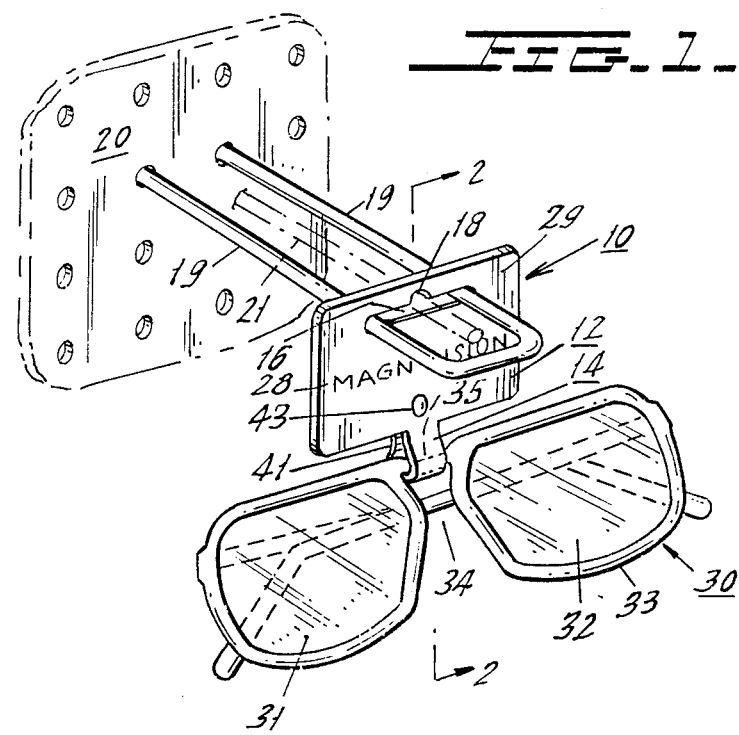
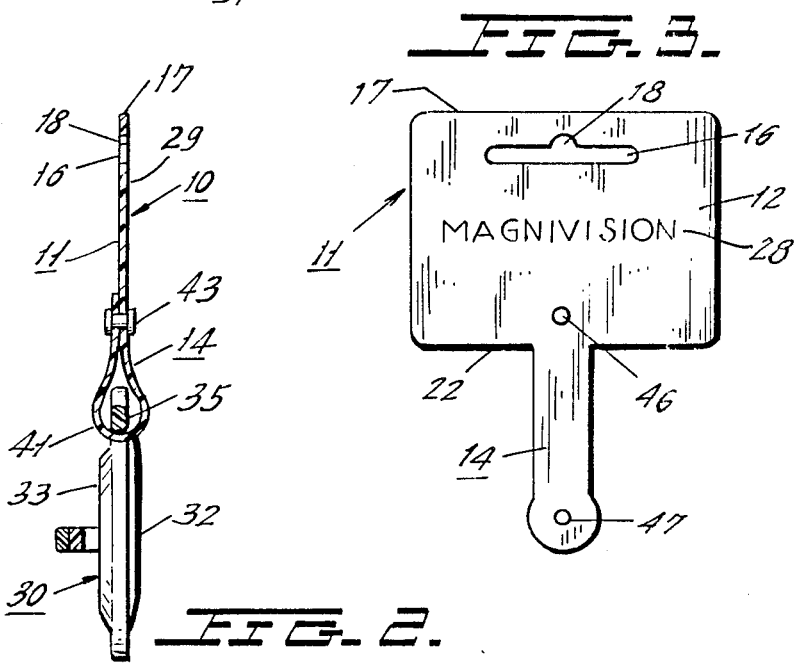

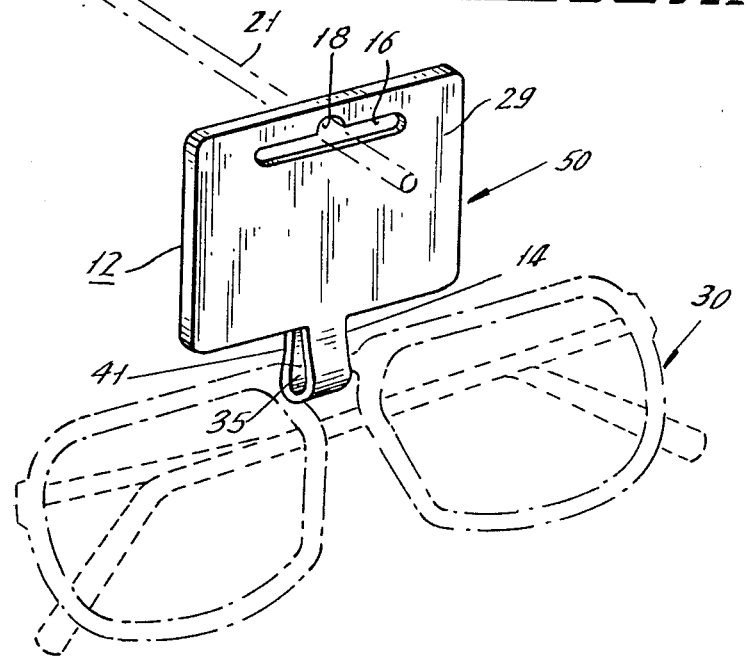
FIG. 4
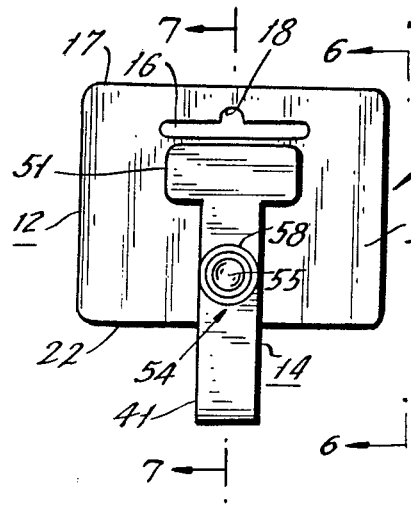
FIG. 5
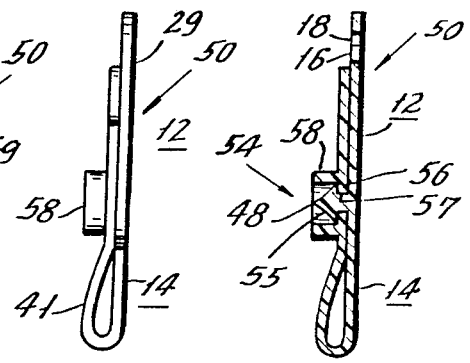
FIG. 6
FIG. 7

HANGER FOR DISPLAYING EYEGLASSES

This application is a continuation-in-part of my copending U.S. application Ser. No. 145,222 filed Jan. 19, 1988.

BACKGROUND OF THE INVENTION

This invention relates to product displays in general and more particularly relates to hangers for displaying eyeglasses.

In many localities, non-prescription eyeglasses, otherwise known as magnifiers, are becoming increasingly available at pharmacies and other retail outlets. As contrasted with prescription eyeglasses, non-prescription eyeglasses are more easily replaced when lost or damaged, are relatively inexpensive and the inconvenience (loss of time) of being examined is avoided, as is the expense of transportation to a doctor's office instead of to a local store.

Typically, without the help of a sales person, a customer selects a pair of non-prescription eyeglasses from a display by trying on a number of pairs until he locates a pair that is comfortable both physically and optically. Generally, prior art displays for this type of eyeglasses provided an individual cubby hole for each pair of eyeglasses, whether boxed or unboxed, or there were individual positioning and holding means provided for each pair of eyeglasses. Whenever a customer removed a pair of eyeglasses, the display did not exhibit a pair of eyeglasses having the same physical size and optical properties as the pair that was removed until a store employee obtained another pair and mounted same on the display. Often this meant that certain eyeglasses of particular sizes and/or optical powers were not on display for substantial portions of the business day.

SUMMARY OF THE INVENTION

In accordance with the instant invention an individual hanger is secured to each pair of eyeglasses in such a way that the customer may try on the eyeglasses without the necessity of removing the hanger therefrom. That is, the hanger is constructed of relatively stiff resilient plastic sheet material that is provided with a loop portion that wraps loosely around the bridge of the eyeglass frames. The hanger is constructed with an aperture that receives a cantilevered bar projecting horizontally from a wall of the display, which bar may be of the single or double arm type illustrated in U.S. Pat. No. 4,502,602, issued Mar. 5, 1985 to R.K. Swanson for Display Fixture With Removable Arm For Use With Perforated Board Each bar is intended to support a plurality of glasses of the same type (frame style, frame size and optical characteristics). A portion of the hanger may carry indicia identifying the source of the product, style number, description, size and/or optical characteristics as contrasted with stickon labels that were used in the prior art for product identifying information.

A rivet or other fastener that is not readily removable is used to maintain the loop portion closed. The rivet or other fastener, and the hanger are strong enough so that the hanger cannot be removed casually from the eyeglasses. The rugged construction and securement of the hanger serves to reduce pilferage that was occurring when a customer readily removed a stick-on label from a selected pair of eyeglasses and wore the selected pair as he left the store without paying for the eyeglasses.

OBJECTS OF THE INVENTION

Accordingly, the primary object of the instant invention is to provide a novel construction for a product display hanger.

Another object is to provide a novel improved hanger for displaying eyeglasses.

Still another object is to provide a hanger of this type that is useful in reducing pilferage.

A further object is to provide a hanger of this type that is relatively inexpensive.

A still further object is to provide a hanger of this type that remains affixed to the product while the customer wears the product to determine whether it should be selected.

BRIEF DESCRIPTION OF THE DRAWINGS

These objects as well as other objects of this invention shall become readily apparent after reading the following description of the accompanying drawings in which:

FIG. 1 is a perspective of a hanger constructed in accordance with teachings of the instant invention, mounting a pair of eyeglasses on a cantilevered bar that protrudes from a wall of a display device.

FIG. 2 is a cross-section taken through line 2—2 of FIG. 1 looking in the direction of arrows 2—2

FIG. 3 is a plan view of the main element for a hanger constructed in accordance with teachings of the instant invention.

FIG. 4 is a view similar to that of FIG. 1 illustrating a second embodiment of this invention in which the fastening means is formed integrally with the other portions of the hanger.

FIG. 5 is a side elevation looking in the direction of arrows 6—6 in FIG. 5.

FIG. 7 is a cross-section taken through line 7—7 of FIG. 5 looking in the direction of arrows 7—7.

DETAILED DESCRIPTION OF THE PREFERRED EMBODIMENT

Now referring particularly to FIGS. 1, 2 and 3. Hanger 10, constructed in accordance with a first embodiment of the instant invention, includes main element 11 (FIG. 3) which is a single sheet of relatively stiff resilient plastic material, typically a polythene. Element 11 consists of rectangular relatively wide main section or body 12 and relatively narrow extension 14. It is intended that front surface 29 of body 12 bear identifying indicia 28 Body 12 is provided with elongated aperture section 16 that is substantially longer than the width of extension 14, and is disposed in the vicinity of and extends parallel to edge 17. Centered between the ends of aperture section 16 and extending therefrom toward edge 17 is notch-like aperture section 18. Elongated section 16 is adapted to receive a cantilevered support comprising spaced parallel arms 19, 19, which project horizontally from wall 20, while notch section 18 is adapted to receive a cantilevered support consisting of single horizontal arm 21. Extension 14 is centered along edge 22 of main section 12 and is centered with respect to the length of aperture 16. Edge 17 is parallel to edge 22 and prior to formation of loop 41 (FIG. 2), the entire extension 14 projects from edge 22 away from edge 17.

Non-prescription eyeglasses 30 is a try-on article that includes lenses 31, 32 which are positioned by frame 33 with nose gap 34 therebetween Bridge 35 of frame 33 extends across gap 34 at the upper end thereof. Extension 14 runs through gap 34 and is reversely bent to form loop 41 that encircles bridge 35. Loop 41 is maintained closed by fastening means in the form of metal rivet 43 which extends through aperture 46 in main section 12 and aperture 47 in extension 14 near the free end thereof.

Hanger 10 and eyeglasses 30 are proportioned so that they cannot be separated without opening loop 41. That is, the portions of frame 33 that surround lenses 31, 32 are too large to pass through loop 41. However, there is sufficient play between hanger 10 and eyeglasses 30 to permit a customer to try on the latter without removing hanger 10. When eyeglasses 30 are being fitted, main section 12 is intended to be in front of the customer's forehead in a position that does not interfere with the customer's view or effect positioning of eyeglasses 30.

While the FIG. 1 illustrates only a single pair of eyeglasses 30 and its hanger 10 mounted on support arms 19, 19, it should now be apparent to those skilled in the display art that support arms 19, 19 and/or 21 are intended to support a plurality of pairs of eyeglasses 30 each secured to an individual hanger 10. It should also now be apparent to those skilled in the art that loop 41 need not be formed integrally with body 12, but can be formed by a separate member (not shown) that is attached to body 12 by fastening means which may be the same rivet 43 that is used to maintain loop 41 closed.

Now referring to FIGS. 4 through 7 which illustrate a second embodiment of the instant invention. Where elements of the first and second embodiments are the same or substantially the same like reference numerals are used to indicate these elements in the drawings for both of the embodiments In particular, hanger 50 of FIGS. 4-7 is constructed of a moderately stiff yet flexible plastic material and consists of relatively wide rectangular main section or body 12, relatively narrow body extension 14 and fastening means 54. Typically, components 12, 14 and 54 are integrally formed by molding and/or stamping.

Extension 14 projects from the center of one of the long sides 22 of body 12. Narrow slot 16, to receive cantilever support elements 19, 19, is disposed adjacent the other long side 17 of body 12. Extension 14 is centered with respect to the length of slot 16 and extends away from edge 17. Fastening means 54 includes conical button 55 which is disposed slightly to the rear of body 12 near edge 22 and is connected thereto by shank 57 which extends to the base of button 55. The length of shank 57 is approximately equal to the thickness of body 12.

To form loop 41 around bridge 35 of eyeglasses 30, the free end of extension 14 is rearwardly bent and button 55 is forced through aperture 57 in extension 14 near transverse tab 51 which is at the free end of extension 14. Molded integrally with extension 14 is barrier 58 which surrounds button 55 when loop 41 is closed and is provided with an inside diameter which is equal approximately to the outer (base) diameter of button 55. The height of barrier 58 is equal approximately to the height of button 55 which is measured from its enlarged base to its rearward facing relatively pointed apex or tip 48. Barrier 58 prevents pointed tip 48 from pressing into the forehead of a person who is trying on eyeglasses 30. The first time loop 41 is formed, considerable force is required to insert button 55 through aperture 57. Reinforcement provided by barrier 58 and the nature of the material from which hanger 50 is constructed are such that after the first time button 55 travels through aperture 57, loop 41 cannot be opened casually. However, after button 55 moves through aperture 57 in both directions, aperture 57 becomes enlarged to the extent that fastening means 54 no longer provides a secure connection between the free end of extension 14 and body 12.

Transverse tab 51, located at the free end of extension 14 and outboard of aperture 57, constitutes a grip to facilitate opening of the connection made by fastening means 54. While extension 14 is substantially narrower than slot 16, tab 51 is almost the length of slot 16. Even by gripping tab 51 considerable effort must be exerted for initial opening of loop 41.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. Hanger means for displaying a try-on article at a retail establishment, and permitting such try-on article to be fitted in normal wearing position while said hanger means is attached thereto, said hanger means including:
    a body having aperture means adapted to receive a horizontally extending cantilevered support, and an extension projecting from an edge portion of said body and having a free end;
    said extension being adapted to operatively hold a try-on article by reversely bending said extension and having said free end fixedly held by fastening means disposed in the vicinity of said edge portion to form a closed loop that wraps around a selected portion of a try-on article and cooperates therewith to prevent separation of said hanger means from such try-on article without opening said closed loop;
    said extension being formed integrally with the body;
    said body and said extension being sheet-like and being constructed of relatively stiff plastic material, with said extension being bendable;
    fastening means formed integrally with said body and said extension;
    said fastening means including cooperating first and second sections which when operatively engaged maintain said loop closed;
    said first section comprising a hole and said second section comprising a button that is adapted to be forced through said hole to bring the first and second sections into operative engagement;
    a safety barrier formed integrally with said body and said extension, said safety barrier surrounding said button when said first and second sections are operatively engaged;
    said body being relatively wide and said extension being relatively narrow;
    said aperture means being elongated and being positioned in the vicinity of and extending parallel to another edge portion of said body that is opposite the edge portion having the extension projecting therefrom;
    said extension being substantially narrower than the length of said aperture means and being centered lengthwise with respect to said aperture means.

2. Hanger means as set forth in claim 1 in which the hole is in said extension;

said button being disposed at the rear of the body and being connected thereto by a shank that is disposed within said hole when the first and second sections are operatively engaged.

3. Hanger means as set forth in claim 1 in which the safety barrier also constitutes reinforcing means surrounding said hole in close proximity thereto to impede operative disengagement between said first and second sections.

4. Hanger means as set forth in claim 3 in which the plastic material is a polythene.

5. Hanger means as set forth in claim 1 in which there is a transverse projection formed integrally with said extension at its free end;

said projection being disposed outward of said fastening means and being provided as a gripping means to which a force is applied to disengage said first and second sections.

6. Hanger means as set forth in claim 1 in combination with eyeglass frame means;

said frame means including first and second sections for maintaining respective first and second lenses positioned side by side with a nose gap open at one end disposed therebetween, and a bridge connected between said first and second sections and extending across said gap at its other end;

said extension passing through said gap and said loop encircling said bridge;

said first and second sections of said fastening means being operatively engaged to maintain said loop closed;

said loop being proportioned to cooperate with said frame means for preventing separation of said hanger means from said frame means without opening said loop, and permitting a customer to try on said frame means while said hanger means is mounted thereto.

7. Hanger means in combination with eyeglass frame means as set forth in claim 6 in which the hole is in said extension;

said button being disposed at the rear of the body and connected thereto by a shank that is disposed within said hole when the first and second sections are operatively engaged.

8. A pair of eyeglasses and hanger means for removably mounting said eyeglasses on a horizontally extending cantilevered support;

said eyeglasses including first and second lenses positioned side by side with a nose gap open at one end disposed therebetween, a bridge extending across said gap at its other end, and temples operatively connected to said lenses at pivot points disposed remote from said nose gap;

said hanger means including a body having aperture means adapted to receive a horizontally extending cantilevered support, an extension projecting from a bottom edge portion of said body and bent to pass through said gap and form a loop that encircles said bridge, and fastening means in engagement with said extension to maintain said loop closed;

said loop being proportioned to cooperate with said eyeglasses for preventing separation of said hanger means from said eyeglasses without opening said loop, and for permitting a customer to try on said eyeglasses while said hanger means is mounted thereto;

with said temples folded, said eyeglasses constituting an elongated unit having its longitudinal axis positioned horizontally and below said body when said eyeglasses are mounted on a horizontally extending cantilevered support by said hanger means.

9. Eyeglasses and hanger means as set forth in claim 8 in which the extension is formed integrally with the body.

10. Eyeglasses and hanger means as set forth in claim 9 in which the body and the extension are sheet-like and constructed of plastic material that is resilient and is relatively stiff.

11. Eyeglasses and hanger means as set forth in claim 12 in which said fastening means is formed integrally said fastening means including cooperating first and second sections which when operatively engaged maintain said loop closed;

said first section comprising a hole and said second section comprising a button that is adapted to be forced through said hole to bring the first and second sections into operative engagement;

reinforcing means formed integrally with said body and said extension;

said reinforcing means surrounding said hole in close proximity thereto to impede operative disengagement between said first and second sections.

12. Eyeglasses and hanger means as set forth in claim 11 in which said reinforcing means is constituted by a safety barrier formed integrally with said extension, said barrier surrounding said button when said first and second sections are operatively engaged.

13. Eyeglasses and hanger means as set forth in claim 10 in which the plastic sheet material is a polythene.

14. Eyeglasses and hanger means as set forth in claim 8 in which the body is substantially wider than the gap and the extension is slightly narrower than the gap.

15. Eyeglasses and hanger means as set forth in claim 14 in which:

the extension is elongated;

the aperture means is positioned in the vicinity of another edge portion of said body that is opposite the edge portion having the extension projecting therefrom;

the aperture means comprises an elongated slot that is substantially longer than the width of that portion of the extension which surrounds said bridge; and the slot is centered with respect to the extension and is positioned with its longitudinal axis perpendicular to the longitudinal axis of said extension.

16. Eyeglasses and hanger means as set forth in claim 8 in which a metal rivet constitutes the securing means and the extension must be severed to release the eyeglasses from the hanger means.

17. Eyeglasses and hanger means as set forth in claim 15 in which the extension is formed integrally with the body.

18. Eyeglasses and hanger means as set forth in claim 17 in which the body and the extension are constructed of resilient relatively stiff bendable plastic sheet material.

19. Eyeglasses and hanger means as set forth in claim 18 in which the plastic sheet material is a polythene.

* * * * *

UNITED STATES PATENT AND TRADEMARK OFFICE
CERTIFICATE OF CORRECTION

PATENT NO. : 4,976,532
DATED : December 11, 1990
INVENTOR(S) : Michael S. Nyman

It is certified that error appears in the above-identified patent and that said Letters Patent is hereby corrected as shown below:

Column 6, line 16, change "12" to --10--

Column 6, line 16, after "integrally" insert
--with said body and said extension;--

Signed and Sealed this

First Day of September, 1992

Attest:

DOUGLAS B. COMER

Attesting Officer

Acting Commissioner of Patents and Trademarks